R. & B. CRAIN.
SELF FEEDER AND BAND CUTTER FOR THRESHING MACHINES.
APPLICATION FILED FEB. 8, 1910.
977,599.
Patented Dec. 6, 1910.
5 SHEETS—SHEET 2.
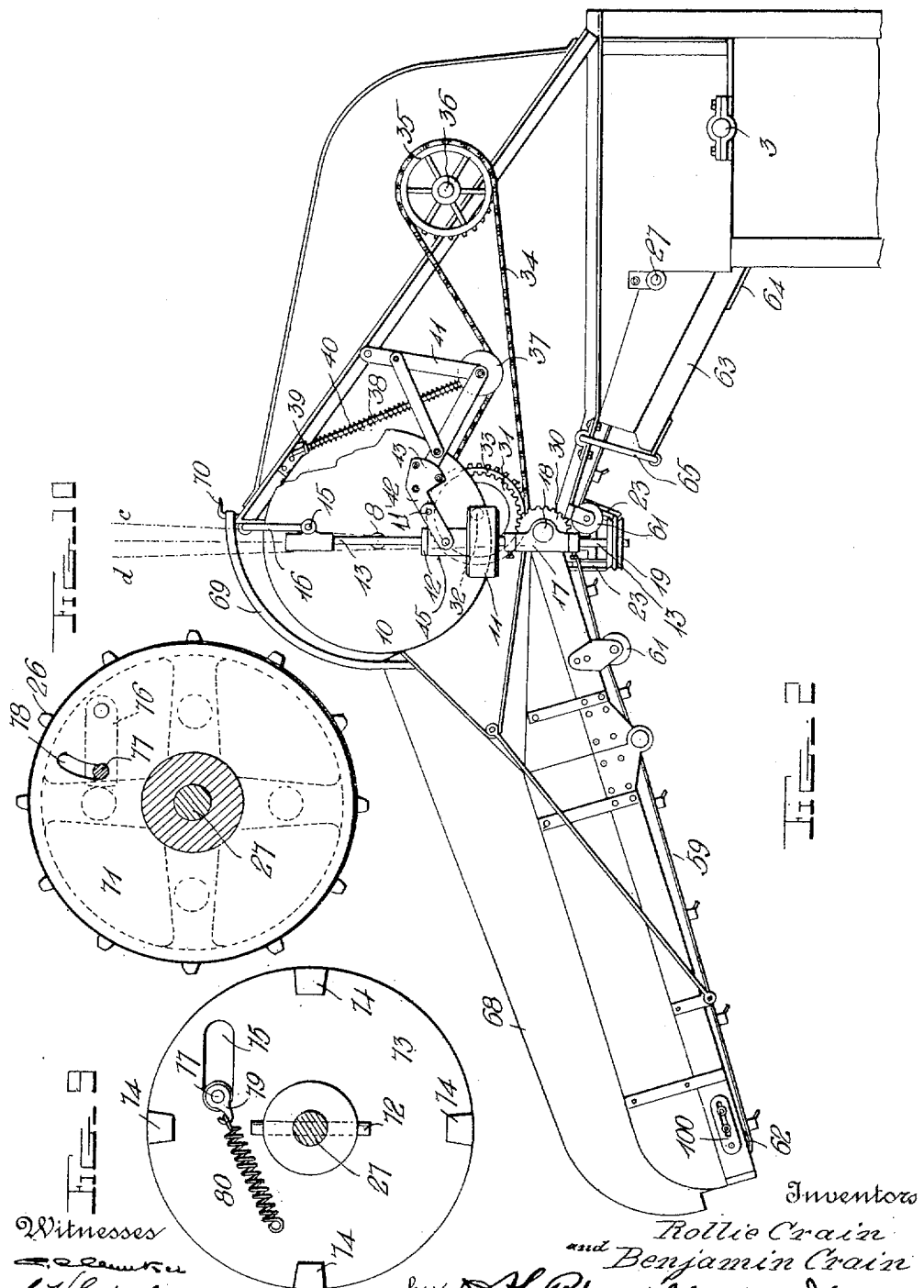

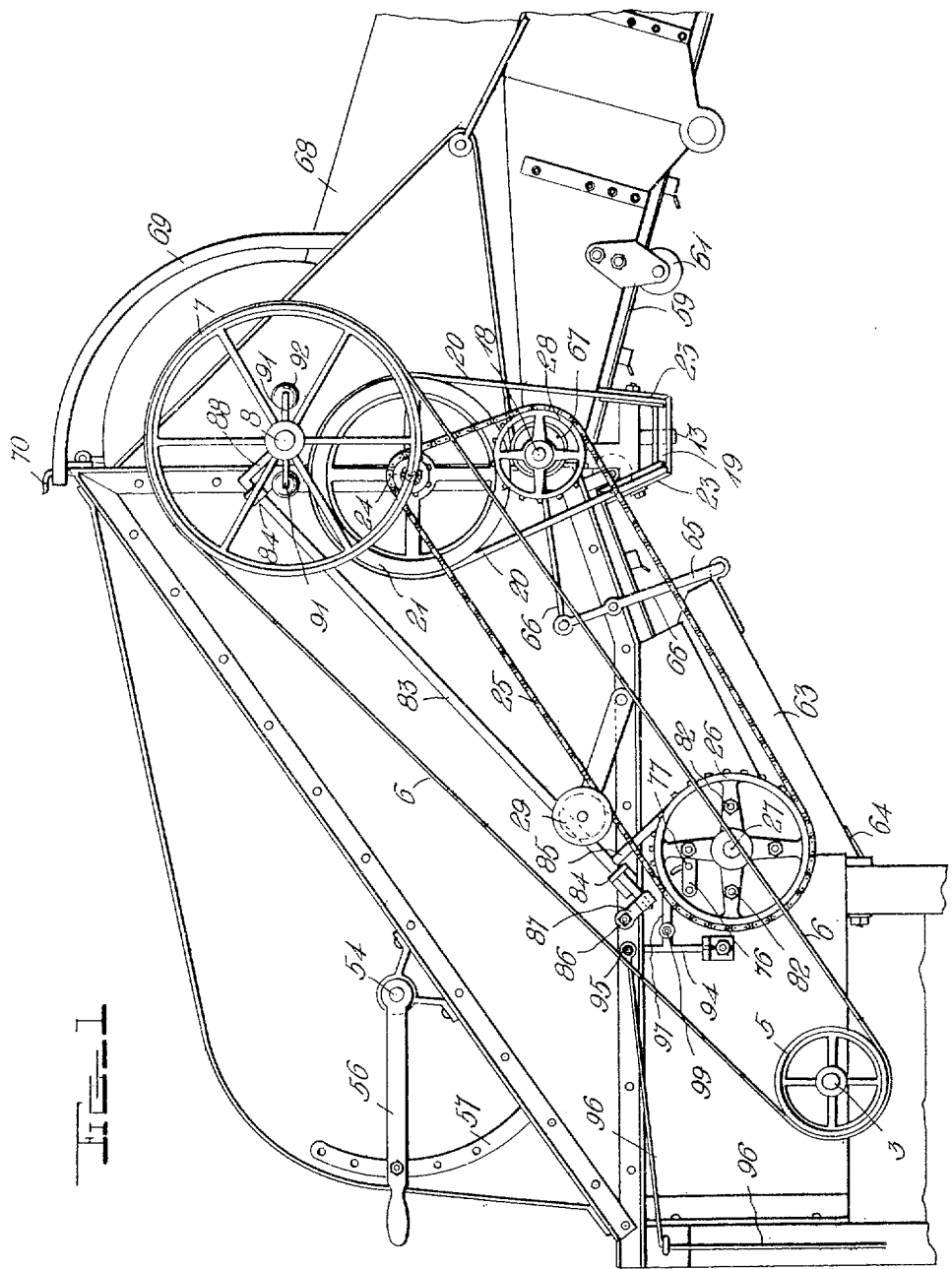

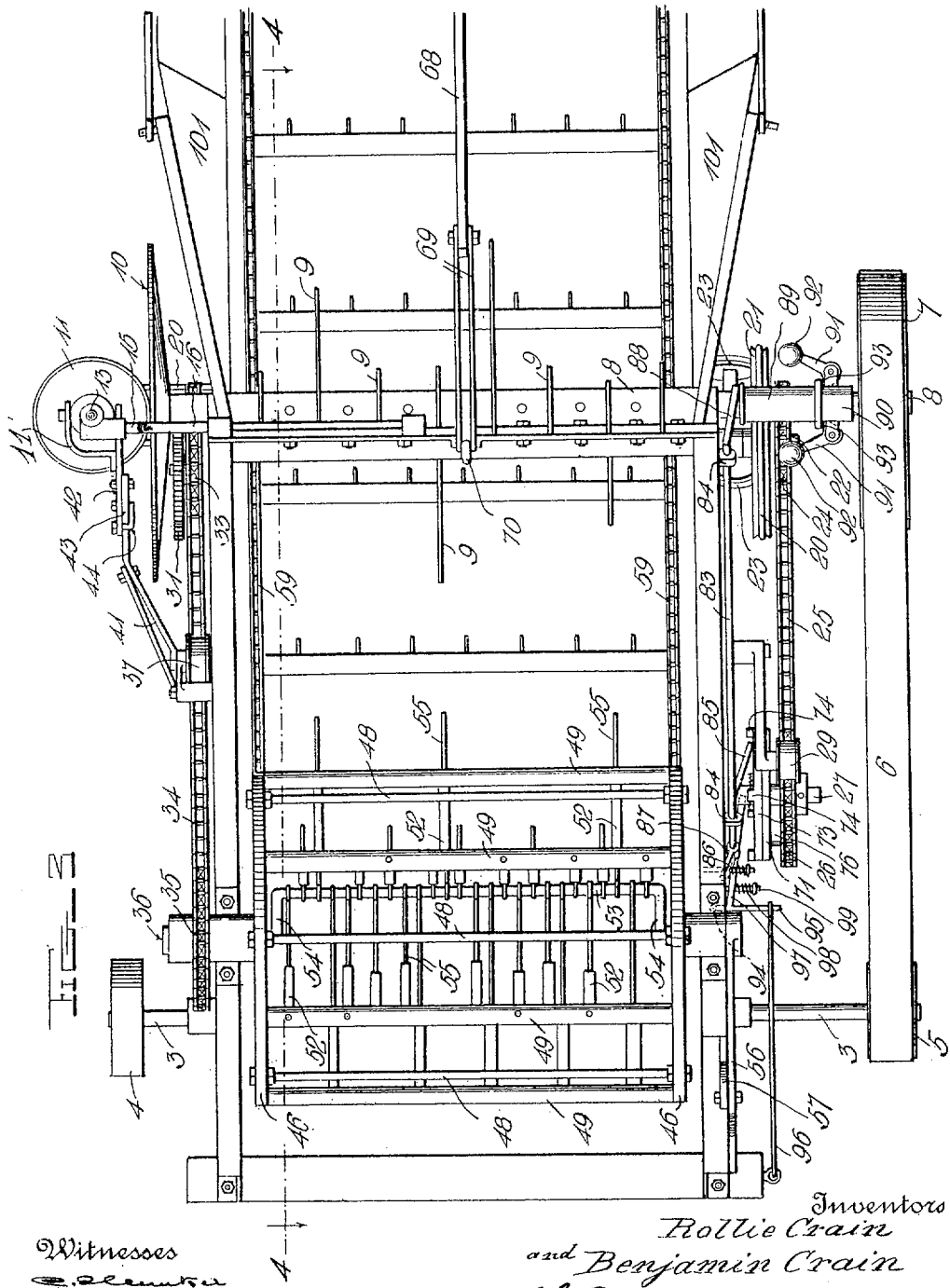

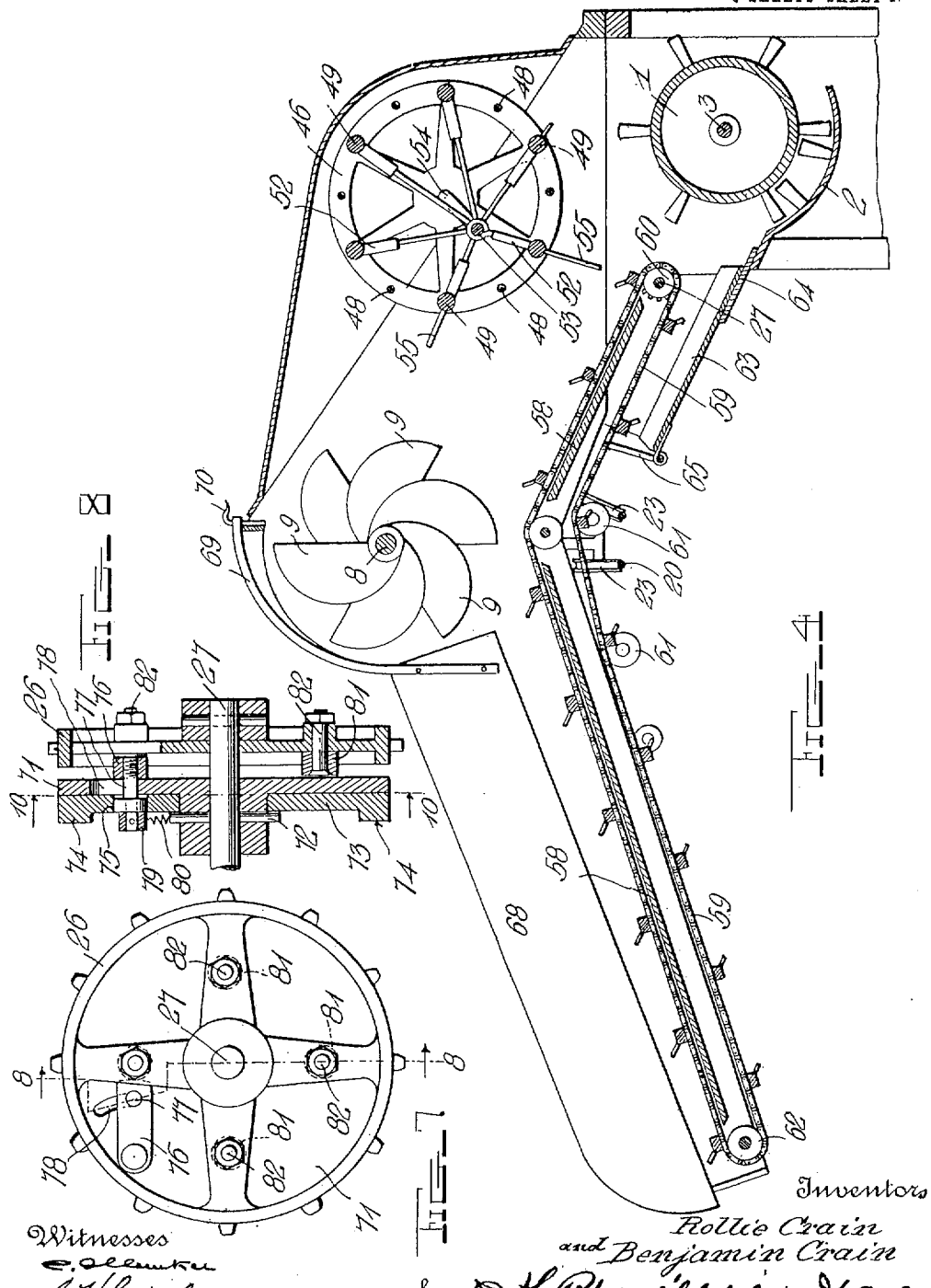

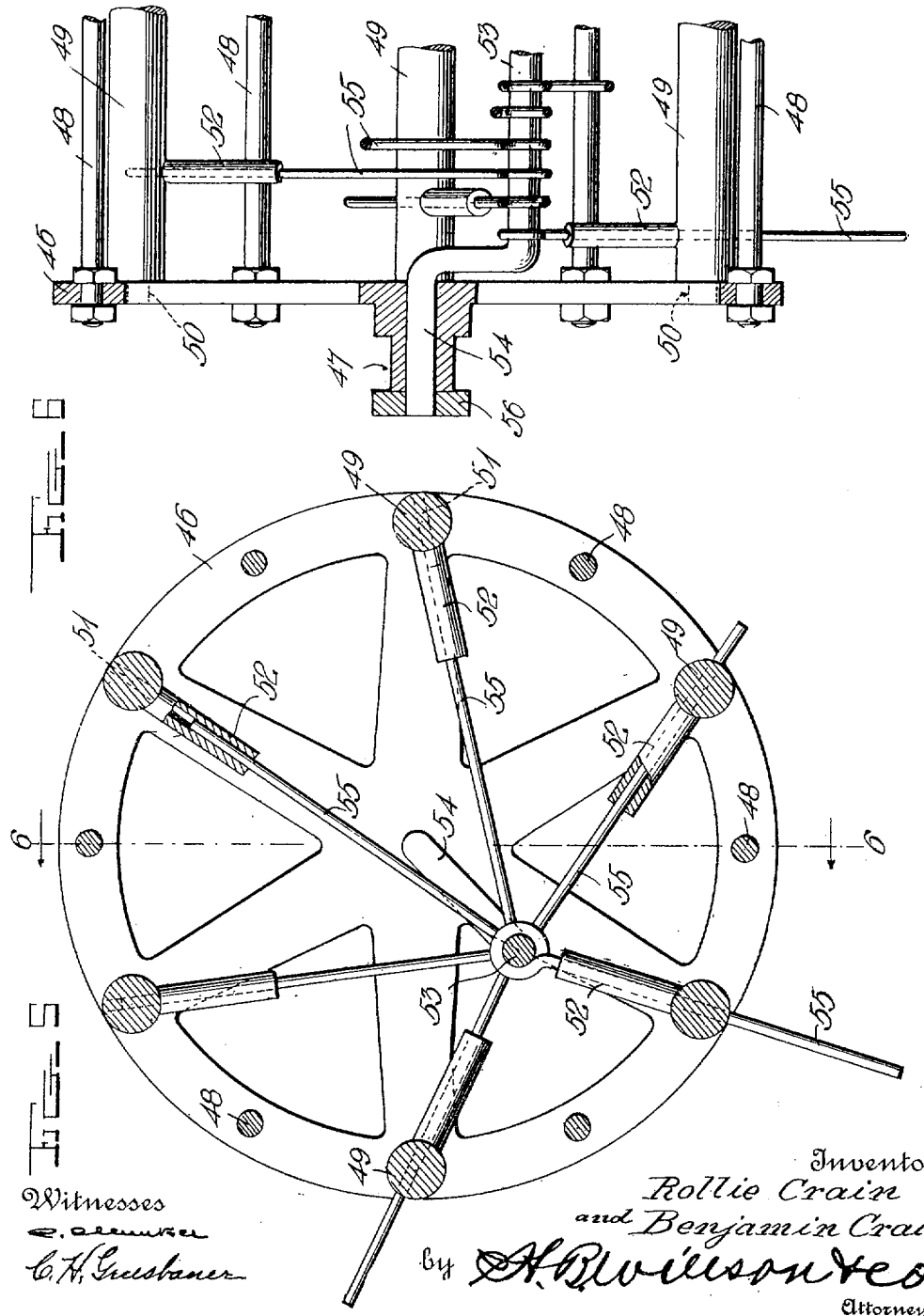

UNITED STATES PATENT OFFICE.

ROLLIE CRAIN AND BENJAMIN CRAIN, OF MARION, ILLINOIS.

SELF-FEEDER AND BAND-CUTTER FOR THRESHING-MACHINES.

977,599. Specification of Letters Patent. Patented Dec. 6, 1910.

Application filed February 8, 1910. Serial No. 542,676.

*To all whom it may concern:*

Be it known that we, ROLLIE CRAIN and BENJAMIN CRAIN, citizens of the United States, residing at Marion, in the county of Williamson and State of Illinois, have invented certain new and useful Improvements in Self - Feeders and Band - Cutters for Threshing-Machines; and we do declare the following to be a full, clear, and exact description of the invention, such as will enable others skilled in the art to which it appertains to make and use the same.

This invention relates to improvements in self feeders and band cutters for threshing machines.

One object of the invention is to provide an improved feeding device that will automatically control the feed of the material passing therethrough by the resistance offered by the material as it passes the threshing mechanism.

Another object is to provide a feeding mechanism which will automatically start when the threshing cylinder has reached the required speed for threshing and which will stop when the cylinder has dropped below the required speed.

A further object is to provide a manually operated means whereby the feeding mechanism may be instantly stopped should any foreign objects get into the grain being fed to the machine or should the threshing mechanism become clogged from any cause.

Still another object is to provide a feeding mechanism which by automatically controlling the feed enables the use of a lighter threshing mechanism and consequently permits the use of a smaller engine and less power, thereby reducing the cost of operating the machine.

With the foregoing and other objects in view, the invention consists of certain novel features of construction, combination and arrangement of parts as will be more fully described and particularly pointed out in the appended claims.

In the accompanying drawings, Figure 1 is a side view of one side of the upper portion of a threshing machine embodying our improvements; Fig. 2 is a similar view of the other side of the machine on a smaller scale; Fig. 3 is a top plan view of the same; Fig. 4 is a vertical longitudinal section on a smaller scale taken on the line 4—4 of Fig. 3; Fig. 5 is an enlarged vertical cross sectional view of the automatic operating mechanism for the speed regulating device of the machine; Fig. 6 is a vertical longitudinal sectional view of one end of the same parts; Fig. 7 is a side view of the drive sprocket and clutch mechanism for throwing the feeding mechanism into and out of gear; Fig. 8 is a central vertical cross section of the same taken on the line 8—8 of Fig. 7; Fig. 9 is a side view of the trip collar and pawl carrying disk of the clutch mechanism; Fig. 10 is a similar view of the pawl carrying disk.

Referring more particularly to the drawings, 1 denotes the threshing cylinder which is arranged in the machine in the usual or any desired manner and which is adapted to co-act with a concave 2 of the usual or any desired construction. The shaft 3 of the cylinder 1 is mounted in the frame of the machine and projects beyond the opposite sides thereof and is provided on one end with a drive pulley 4 adapted to be connected with any suitable operating mechanism. On the opposite end of the shaft 3 is fixedly mounted a drive pulley 5 connected by a belt 6 to a drive pulley 7 fixed on one end of a cutter operating and power transmitting shaft 8, which extends transversely through the upper portion of the machine and is revolubly mounted in suitable bearings in the sides thereof. On the shaft 8 and immediately over the grain conveying or feeding mechanism is arranged a series of segmental band cutting blades 9, said blades projecting radially from and at different positions on the shaft 8, as shown. On the opposite end of the shaft 8 from the pulley 7 is fixedly mounted a friction driving disk 10 with the flat outer face of which is engaged a friction drive gear 11. The gear 11 is provided with an elongated hub 12 and is keyed to slide on a vertically disposed shaft 13, the upper end of which is revolubly mounted on the cranked outer end 15 of a rock shaft 16, which is journaled in suitable bearings in the upper portion of the frame of the machine as clearly shown in Figs. 2 and 3 of the drawings.

The lower end of the shaft 13 is revolubly mounted in a bearing 17 which is pivoted on the end of a transversely disposed power transmitting shaft 18 journaled in the machine below the band cutting mechanism. The shaft 18 is revolubly mounted in suitable bearings in the frame of the machine and has its opposite ends projecting beyond the sides of the frame. By thus pivotally mounting the shaft 13 and slidably mounting the friction gear 11 thereon, said parts are adapted to be shifted to bring the gear nearer to or farther from the center of the friction drive disk 10 by an automatic shifting mechanism hereinafter described, thereby regulating the speed of the shaft 13 and the parts operated thereby.

On the lower end of the shaft 13 is fixedly mounted a grooved drive pulley 19 which is connected by a round belt 20 with a grooved guide pulley 21 fixed on a stud shaft 22 on the opposite side of the frame of the machine. In running from the pulley 19 to the pulley 21, the belt 20 passes under the machine and around suitable guide pulleys 23 arranged below the pulley 21 as shown. Detachably fixed by any suitable means to the shaft 22 of the pulley 21 is a sprocket pinion 24, which is connected by a sprocket chain 25 with a sprocket gear 26 which is loosely mounted on a conveyer operating shaft 27 by means of which the grain conveyer is operated, as will be hereinafter more fully described. The sprocket chain 25 in passing from the sprocket pinion 24 to the sprocket gear 26, also engages a sprocket gear 28, which is fixedly mounted on the shaft 18 whereby said shaft is driven. The sprocket gear 24 being detachably secured to the shaft 22 of the grooved pulley 21 is adapted to be disengaged therefrom and removed from the shaft 22 and a larger pinion substituted therefor if desired. Adapted to be engaged with the sprocket chain 25 is a chain tightening device 29 whereby the chain is kept at the proper tension.

On the shaft 18 adjacent to the loosely mounted bearing 17 which supports the shaft 13 is a spur gear pinion 30. The pinion 30 is engaged with and drives the spur gear 31 which is loosely mounted on a stub shaft 32, secured to the adjacent side of the machine. With the gear 31 is connected a sprocket gear 33 which is connected by a sprocket chain 34 to a sprocket gear 35 fixedly mounted on the outer end of one of the trunnions 36 of a speed controlling mechanism hereinafter described.

Engaged with the chain 34 is a chain tightening device comprising a roller 37 connected to the lower end of a tension rod 38, the upper end of which is slidably engaged with a bracket 39 secured to the frame of the machine. On the rod 38 is arranged a coiled spring 40, the pressure of which holds the roller 37 down into yielding engagement with the chain 34. The roller 37 is mounted in the lower end of a gear adjusting frame 41, one end of which is pivotally connected to the side of the feeder frame, while the opposite end is pivotally connected to a gear adjusting lever 42. The connected end of the lever 42 is provided with a segmental plate 43 on the inner side of which is arranged a guide bail 44 which limits the movement of the lever 42 on the end of the frame 41. The outer end of the lever 42 is bifurcated and is pivotally connected with a sleeve 45 loosely mounted on the hub 12 of the friction gear 11. A bracket 11' is also connected with the lever 42 and with the sleeve 45 (see Figs. 2 and 3).

By connecting the belt tightening device 37 and the gear adjusting frame 41 with the chain 34, as herein shown and described, it will be seen should the trunnion 36 of the speed controlling mechanism be stopped or slowed up in its movement, that the upper stretch of the chain 34 would be drawn taut by the sprocket gear 33 moving faster than the sprocket gear 35 which would cause the belt tightening pulley 37 to be lifted against the tension of the spring 40 on the rod 38, thereby rocking the frame 41 and causing the latter through the lever 42 to rock or swing the shaft 13 on the shaft 18 to the position shown by the dotted line $c$ in Fig. 2 of the drawings. This slight inclination or angularity of the shaft 13 and the friction drive gear 11 slidably mounted thereon will cause the said gear to travel upwardly on the revolving friction disk 10, thereby decreasing the speed of the friction gear which is operatively engaged with the disk as hereinbefore described. This regulation of the speed of the drive gear 11 also regulates the speed of the shaft 13 and all of the parts operated or driven thereby, thus reducing the speed of the conveyer shaft and conveyer, whereby the grain is fed more slowly to the threshing mechanism. On the other hand, if the resistance offered to the rotation of the speed controlling mechanism is overcome by the tension of the spring 40 of the chain tightening device, the adjusting frame 41 and lever 42 are caused to swing the shaft 13 and friction gear 11 in the opposite direction or to the position shown in dotted lines $d$. When the shaft 13 is adjusted to this inclination or angularity, the friction gear 11 will be caused to again move outwardly toward the outer edge of the friction drive disk 10, thus increasing the speed of the gear 11, as will be understood. This increase in the speed is also imparted to the shaft 13 and all of the parts operated thereby, thus increasing the speed of the conveyer or feeding mechanism. It will be understood that the pressure of the spring 40 on the belt tightener 37 is gaged so that when the grain is being fed to the threshing mechanism under proper conditions, the shaft 13 will be held in perpendicular position and in a vertical plane with the center of the drive disk 10, thus causing the drive gear to travel in a horizontal plane and at a normal speed when operated by the friction disk.

The speed retarding or controlling mechanism comprises a cylindrical frame consisting of circular heads 46, one of which is provided with a central laterally projecting bearing trunnion 36 and the other with a bearing trunnion 47, said trunnions being revolubly mounted in suitable bearings on the frame of the machine. The heads 46 are held together and spaced apart by an annular series of tie rods 48. Between the heads 46 and alternating with the rods 48 are a series of sleeve carrying bars 49, the outer ends of which are reduced to form bearing trunnions which are revolubly mounted in suitable bearing apertures 50 formed in the heads 46 as shown in Fig. 6. The bars 49 are provided with a series of transverse apertures 51 and with said bars opposite each of the passages 51 is secured an inwardly projecting guide sleeve 52, the passages in said sleeves coinciding with or forming a continuation of the passages 51 in the bars.

Between the heads 46 is arranged a rock shaft 53 having cranked outer ends 54 which are engaged with bearing apertures formed in the trunnions 36 and 47 of the heads 46. With the shaft 53 are loosely connected the inner ends of a series of retarding fingers 55 which are slidably engaged with the sleeves 52 and in the passages 51 in the bars 49, whereby when said cylindrical frame is revolved by the sprocket chain 34, said fingers will be carried around the shaft 53 and will be successively projected through the lowermost bar 49 and into engagement with the grain passing beneath the same on the conveyer. It will thus be seen that when the grain is fed or passed below the cylindrical frame at a less speed than that at which the frame is revolving the engagement of the fingers 55 with the grain will retard the movement of the cylinder and the sprocket gear 35 mounted on one end thereof, thus holding back on the drive chain 34 will tighten it against the tension of spring 40 and cause the frame 41 to move upwardly and thus actuate the lever 43 to shift the shaft 13 and friction gear 11 as hereinbefore described. On one of the cranked ends 54 of the rock shaft 53 is secured a shaft adjusting lever 56, the outer end of which has an adjustable connection with a segmental holding plate 57 secured to the side of the feeder frame as shown.

The grain conveying mechanism comprises a deck 58 which is arranged at an angle in the machine as shown and around which is adapted to travel a slatted conveyer belt or raddle 59, which passes around sprocket gears 60 on the conveyer operating shaft 27 and over suitable guide pulleys 61 and around guide pulleys 62 at the opposite end of the deck as shown. Below the discharge end of the conveyer is arranged a grain pan 63 supported and connected at one end to the concave 2 by a shoe 64 and at its opposite end in a hanger 65 which is pivotally mounted in the frame of the machine. The pan 63 is adapted to be reciprocated on the shoe 64 by means of a reciprocating rod 66 which is connected to the upper end of one of the hangers and to an eccentric 67 arranged on the power transmitting shaft 18. Over the feed end of the conveyer is arranged a centrally disposed dividing board 68, the outer end of which is suitably supported on the frame of the machine, while the inner end is connected to and suspended over the conveyer by a bail shaped hanger 69, the upper end of which is connected to a hook 70 on the upper portion of the conveyer frame.

As hereinbefore stated, the drive sprocket 26 is loosely mounted on the conveyer operating shaft 27, and said gear is adapted to be operatively connected with said shaft by an automatically operated clutch mechanism comprising a pawl carrying disk 71 which is keyed to the shaft 27 by a pin 72. On the hub of the disk 71 is loosely mounted a trip collar 73, said collar being held in operative engagement with the disk by the projecting ends of the key pin 72. On the outer side of the collar 73 is arranged a series of stop lugs 74, said lugs being preferably arranged at diametrically opposite points on the collar as shown. In the collar 73 adjacent to its outer edge and extending inwardly at a suitable angle is a slot 75, the purpose of which will hereinafter appear.

Pivotally mounted on the side of the disk 71 adjacent to the sprocket gear 26 is a pawl 76 to the free end of which is secured a laterally projecting pin 77, which extends through a segmental slot 78 formed in the disk 71 and through the slot 75 formed in the collar 73. The slot 78 is formed on an arc concentric with the pivot of the lever 76. On the pin 77 where the same passes through the slot 75 in the collar 73 is arranged an antifriction sleeve or roller to prevent the wear of the pin when the collar is shifted. On the outer end of the pin 77 is arranged a nut 79, to which is connected one end of a coiled spring 80, the opposite end of which is secured to the outer side of the collar 73, as shown. On the inner side of the sprocket gear 26 is arranged a series of clutch rollers 81, said rollers being preferably revolubly mounted on short bolts 82 arranged in the spokes of the gear as shown. When the inner end of the pawl 76 is swung into the path of movement of the rollers 81 by the spring 80, the sprocket gear will be operatively engaged with the disk 71 and through the same will drive the shaft 27, thereby operating the conveyer mechanism.

Before the threshing cylinder has obtained sufficient speed for properly threshing the grain or when the speed of the cylinder decreases beyond a predetermined point, the pawl 76 will be held out of the path of movement of the clutch rollers 81 on the drive sprocket 26, thus preventing the rotation of the conveyer shaft 27 by said gear. In order to hold the pawl 76 out of the path of movement of the rollers 81, we provide a stop mechanism comprising a trip rod 83, which is arranged obliquely along the side of the feeder frame and is loosely mounted in suitable bearings 84 secured to the frame. On the rod 83 adjacent to its lower end is formed a right angular outwardly projecting stop arm 85, which is normally projected or held in the path of movement of the stop lugs 74 on the trip collar 73, by means of a coiled spring 86 arranged on a pin or bolt projecting from the side of the frame and bearing against a cranked arm 87 secured to the adjacent end of the rod 83, as shown. By means of the stop arm 85 which is engaged by the stop lugs 74 when in a projected position, the trip collar 73 will be pushed around and held in position to cause the walls of the slot 75 therein to hold the inner end of the pawl 76 out of the path of movement of the rollers on the sprocket gear, thus preventing the rotation of the shaft 27 by said gear.

On the upper end of the trip rod 83 is formed a downwardly projecting crank arm 88, the lower end of which is in engagement with the inner end of a flanged sleeve 89, loosely mounted on the projecting end of the power transmitting shaft 8. On the shaft 8 adjacent to the outer end of the sleeve 89 is secured a centrifugal governor mechanism comprising a fixed sleeve 90, having arranged thereon oppositely disposed pairs of apertured bearing ears or lugs between which are pivotally mounted levers 91, having on their outer ends balls or weights 92 and on their inner ends right angular sleeve engaging lugs 93, which bear against the outer end of the sleeve 89, whereby when the shaft 8 has attained sufficient speed to swing the weighted levers 91 outwardly, said lugs 93 will force the collar 89 inwardly against the crank arm 88 of the trip rod 83, thereby rocking said rod and swinging the stop arm 85 inwardly and out of engagement with the stop lugs 74 on the trip collar 73, thus permitting the spring 80 to draw the collar around and the inner end of the pawl inwardly and into the path of movement of the rollers 81 on the sprocket gear 26, thus operatively connecting said gear with the shaft 27 to cause the same to drive the conveyer mechanism. It will thus be seen that until the shaft 8 and the shaft 3 of the threshing cylinder have obtained sufficient speed for properly threshing the grain, that the governor mechanism will not act on the clutch tripping device, so that the latter is held out of engagement with the drive gear 26, thus preventing the operation of the feeding mechanism. It will be also understood that should the speed of the cylinder shaft fall below a predetermined point that the governor mechanism will release the trip rod and permit its spring to again throw the stop arm 85 into engagement with the stop lugs 74 of the clutch, thus operating the same to disengage the drive wheel from the conveyer shaft.

In order to disconnect the drive gear from the conveyer shaft and thereby instantly stop the operation of the conveyer, thus preventing the feeding mechanism from becoming clogged by foreign objects such as pitch forks or other unthreshable material which may have entered the machine with the grain, a manually operated stop mechanism is provided. This stop mechanism comprises a rock shaft 94 which is mounted in suitable bearings on the side of the machine and is provided on its upper end with a crank arm 95 to which is connected an operating cord 96. The cord 96 may extend to any part of the machine where the same may be conveniently reached by the operator. On the shaft 94 is also formed a right angularly projecting stop arm 97, the inner end of which is adapted to be swung outwardly into the path of movement of the stop lugs 74 on the trip collar, 73 when the shaft 94 is rocked by the operating cord 96, thereby causing the trip collar to shift the pawl 76 out of the path of movement of the rollers on the drive gear 26, thus disconnecting the latter from the conveyer shaft as hereinbefore described. The stop arm 97 is normally held inwardly out of the path of movement of the lugs 74 by a coiled spring 98 which is arranged on a stud bolt 99 projecting outwardly from the side of the machine and through a suitable aperture in the arm 97.

The conveyer 58 is provided with the usual adjustable bearing 100 for the guide roller 62, whereby the slack in the conveyer may be readily taken up. The frame of the machine is provided with the usual feed chute 101 and the frame is suitably braced in the usual or any desired manner.

By means of the improvements herein shown and described, it will be seen that the grain will be fed to the threshing mechanism lengthwise and in the proper quantities, thus preventing the slugging of the threshing cylinder or bending of the cylinder teeth, and without undue pressure on the shaft or operating mechanism thereof, and that the top of the flow of grain will first come into contact with the threshing mechanism. It will also be seen that a uniform speed of the threshing mechanism is obtained by the automatically controlled feeding mechanism, thus permitting the threshing mechanism to thoroughly thresh out and clean the grain, thus saving a larger proportion of the latter than is usually accomplished in threshing machines of this character, and that the feeding mechanism will be automatically started and stopped when the speed of the threshing cylinder is increased or decreased. By this arrangement, the speed of the feed to the threshing cylinder will be decreased when the latter has become wrapped with wet or damp straw which will come into contact with the speed regulating mechanism as the straw is carried around with the threshing cylinder.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention, what we claim is:—

1. A speed controlling device for threshing machines comprising a cylindrical frame having heads at its opposite ends, bearing trunnions formed on said heads, a series of tie rods to connect said heads together, a series of guide bars loosely mounted at their opposite ends in said heads, said bars having formed therein a series of guide passages, a series of guide tubes connected with said rods in line with said passages, a rock shaft arranged between said heads, said rock shaft having cranked outer ends pivotally engaged with said heads, a series of retarding fingers revolubly mounted on said shaft and slidably engaged with the guide apertures and sleeves on said guide bars, and an adjusting lever connected with one end of said rock shaft whereby the latter is held in its adjusted position.

2. In a threshing machine, a revolubly mounted threshing cylinder, a power transmitting shaft operatively connected with said cylinder, a friction drive disk fixedly mounted on said shaft, a pivotally mounted power transmitting shaft, a friction drive gear slidably keyed to said pivoted shaft and adapted to frictionally engage said disk whereby said gear and pivoted shaft are driven, a grain conveyer, a speed regulating mechanism, a driving element to connect said conveyer and speed regulating mechanism with said pivoted shaft whereby said parts are driven, a spring projected tightening device engaged with said driving element, a shaft adjusting mechanism operated by said tightening device whereby when the movement of said speed regulating mechanism is checked by the improper feeding of the grain said shaft will be swung to a position wherein said friction drive gear engages said friction disk at an angle.

3. In a threshing machine, a revolubly mounted threshing cylinder, a power transmitting shaft operatively engaged with said cylinder, an adjustable operating mechanism connected with and driven by said power transmitting shaft and a grain conveyer and a speed controlling device driven by said operating mechanism, said speed controlling device comprising a revolubly mounted cylindrical frame, a series of guide bars loosely mounted in said frame, a rock shaft adjustably mounted in said frame, a series of retarding fingers revolubly mounted on said shaft and slidably engaged with said guide bars whereby when said cylinder is revolved by said operating mechanism said fingers will be successively projected into engagement with the grain being fed by said conveyer whereby the movement of said cylinder is retarded and by said grain when improperly fed by the conveyer, and means actuated by the movement of said cylinder to regulate the operating mechanism driven by said power transmitting shaft, thus controlling the speed of the conveyer.

4. In a threshing machine, a revolubly mounted threshing cylinder, a power transmitting shaft operatively engaged with said cylinder, an adjustable operating mechanism connected and driven by said power transmitting shaft and a grain conveyer and a speed controlling device driven by said operating mechanism, said speed controlling device comprising a cylindrical frame consisting of a pair of heads having formed thereon bearing trunnions revolubly mounted in the frame of the machine, a series of tie rods to connect said heads together, a series of guide bars loosely mounted at their opposite ends in said heads, said bars having formed therein a series of guide passages, a series of guide tubes connected with said rods in line with said passages, a rock shaft arranged between said heads, said rock shaft having cranked outer ends pivotally engaged with said heads, a series of retarding fingers revolubly mounted on said shaft and slidably engaged with the guide apertures and sleeves on said guide bars, an adjusting lever connected with one end of said rock shaft whereby the latter is held in its adjusted position, a gear fixedly mounted on the trunnion of one of said cylinder heads and engaged by the operating mechanism driven by said power transmitting shaft, and means actuated by said speed regulating device to adjust said operating mechanism whereby the speed of the conveyer is automatically controlled.

In testimony whereof we have hereunto set our hands in presence of two subscribing witnesses.

ROLLIE CRAIN.
BENJAMIN CRAIN.

Witnesses:
W. W. SKAGGS,
ALBERT BLEVINS.